(12) United States Patent
Qiu et al.

(10) Patent No.: US 11,379,964 B2
(45) Date of Patent: Jul. 5, 2022

(54) IMAGE PROCESSING METHOD AND APPARATUS, ELECTRONIC DEVICE, AND STORAGE MEDIUM

(71) Applicant: BEIJING SENSETIME TECHNOLOGY DEVELOPMENT CO., LTD., Beijing (CN)

(72) Inventors: Di Qiu, Beijing (CN); Jiahao Pang, Beijing (CN); Chengxi Yang, Beijing (CN); Wenxiu Sun, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 20 days.

(21) Appl. No.: 16/999,165

(22) Filed: Aug. 21, 2020

(65) Prior Publication Data
US 2020/0380661 A1    Dec. 3, 2020

Related U.S. Application Data

(63) Continuation of application No. PCT/CN2019/092608, filed on Jun. 24, 2019.

(30) Foreign Application Priority Data

Jan. 22, 2019   (CN) .......................... 201910060235.2

(51) Int. Cl.
G06T 7/00    (2017.01)
G06T 5/00    (2006.01)
G06T 5/20    (2006.01)

(52) U.S. Cl.
CPC ............ *G06T 7/0002* (2013.01); *G06T 5/001* (2013.01); *G06T 5/20* (2013.01); *G06T 7/97* (2017.01);

(Continued)

(58) Field of Classification Search
None
See application file for complete search history.

(56) References Cited

U.S. PATENT DOCUMENTS

| 8,432,434 B2* | 4/2013 | Veeraraghavan ...... G01B 11/22 348/46 |
| 8,644,697 B1* | 2/2014 | Tzur ....................... G06T 7/529 396/89 |

(Continued)

FOREIGN PATENT DOCUMENTS

| CN | 101631256 A | 1/2010 |
| CN | 101710426 A | 5/2010 |

(Continued)

OTHER PUBLICATIONS

Lai, Hsueh-Ying, Yi-Hsuan Tsai, and Wei-Chen Chiu. "Bridging stereo matching and optical flow via spatiotemporal correspondence." Proceedings of the IEEE/CVF Conference on Computer Vision and Pattern Recognition. 2019. (Year: 2019).*

(Continued)

*Primary Examiner* — Andrae S Allison
(74) *Attorney, Agent, or Firm* — Cooper Legal Group, LLC

(57) ABSTRACT

An image processing method and apparatus, an electronic device, and a storage medium are provided. The method includes: obtaining an infrared image and a color image for the same object in a predetermined scenario, and a first depth map corresponding to the color image; obtaining a first optical flow between the color image and the infrared image; and performing first optimization processing on the first depth map by using the first optical flow to obtain an optimized second depth map corresponding to the color image.

20 Claims, 9 Drawing Sheets

(52) U.S. Cl.
CPC .............. *G06T 2207/10024* (2013.01); *G06T 2207/10028* (2013.01); *G06T 2207/10048* (2013.01)

(56) References Cited

U.S. PATENT DOCUMENTS

| | | | |
|---|---|---|---|
| 9,432,594 B2 | 8/2016 | Kim et al. | |
| 10,453,249 B2* | 10/2019 | Smirnov | G06T 5/001 |
| 2004/0005086 A1* | 1/2004 | Wolff | G06K 9/00228 |
| | | | 382/118 |
| 2007/0019883 A1* | 1/2007 | Wong | G06T 7/571 |
| | | | 382/276 |
| 2013/0271562 A1* | 10/2013 | Kim | G06K 9/00335 |
| | | | 348/33 |
| 2019/0050998 A1* | 2/2019 | Kirby | G06T 7/579 |
| 2020/0013173 A1* | 1/2020 | Lee | G06T 7/55 |

FOREIGN PATENT DOCUMENTS

| | | | |
|---|---|---|---|
| CN | 102663721 | A | 9/2012 |
| CN | 103826032 | A | 5/2014 |
| CN | 102663721 | * | 4/2015 |
| CN | 104616284 | A | 5/2015 |
| CN | 105701811 | A | 6/2016 |
| CN | 108197586 | A | 6/2018 |
| CN | 109819229 | A | 5/2019 |
| JP | 2011209070 | A | 10/2011 |
| TW | 201241789 | A | 10/2012 |

OTHER PUBLICATIONS

Baghaie, Ahmadreza, Roshan M. D'Souza, and Zeyun Yu. "Dense descriptors for optical flow estimation: a comparative study." Journal of Imaging 3.1 (2017): 12. (Year: 2017).*
Pan, Liyuan, et al. "Depth map completion byjointly exploiting blurry color images and sparse depth maps." 2018 IEEE Winter Conference on Applications of Computer Vision (WACV). IEEE, 2018. (Year: 2018).*
Park et al., High-Quality Depth Map Upsampling and Completion for RGB-D Cameras, IEEE Transactions On Image Processing, vol. 23, No. 12, Dec. 2014 5559 (Year: 2014).*
"Temporal consistency algorithm for depth map sequence estimation of stereoscopic video"; Oct. 2015; Duan Fengfeng, Wang Yongbin, Yang Lifang and Yu Pang; Application Research of Computers, vol. 32, No. 10, 5 pgs.
International Search Report in the international application No. PCT/CN2019/092608, dated Oct. 22, 2019, 3 pgs.
First Office Action of the Chinese application No. 201910060235.2, dated Sep. 30, 2019, 17 pgs.
Second Office Action of the Chinese application No. 201910060235.2, dated May 6, 2020, 13 pgs.
Third Office Action of the Chinese application No. 201910060235.2, dated Sep. 30, 2020, 8 pgs.
"Deep End-to-End Alignment and Refinement for Time-of-Flight RGB-D Module"; Sep. 2019; Di Qiu, Joahao Pang, Wenxiu Sun and Chengxi Yang; Computer Science—Computer Vision and Pattern Recognition; 14 pgs.

\* cited by examiner

IMAGE PROCESSING METHOD AND APPARATUS, ELECTRONIC DEVICE, AND STORAGE MEDIUM

CROSS REFERENCE TO RELATED APPLICATIONS

The present application is a continuation of International Patent Application No. PCT/CN2019/092608, filed on Jun. 24, 2019, which claims priority to Chinese Patent Application No. 201910060235.2, filed on Jan. 22, 2019. The disclosures of International Patent Application No. PCT/CN2019/092608 and Chinese Patent Application No. 201910060235.2 are hereby incorporated by reference in their entireties.

BACKGROUND

At present, the ToF (Time of Flight) camera module has attracted widespread attention as a device that actively measures high-quality depth of field. However, how to correctly register its depth features to an RGB main camera is a delicate and important task. The traditional registration scheme is usually based on factory calibration, and does not take into account that camera parameters will be changed during the use of the camera module, such as optical anti-vibration, camera drop during use by a user, and manual disassembly. Under the above circumstances, there will be an error between the real camera parameters and the factory calibration, resulting in that the depth map of the ToF camera cannot be used correctly and there is an error.

SUMMARY

The embodiments of the present disclosure provide an image processing method and apparatus capable of optimizing depth information, an electronic device, and a storage medium.

According to one aspect of the present disclosure, an image processing method is provided, including: obtaining an infrared image and a color image for the same object in a predetermined scenario, and a first depth map corresponding to the color image; obtaining a first optical flow between the color image and the infrared image; and performing first optimization processing on the first depth map by using the first optical flow to obtain an optimized second depth map corresponding to the color image.

According to a second aspect of the present disclosure, an image processing apparatus is provided, including: a first obtaining module, configured to obtaining an infrared image and a color image for the same object in a predetermined scenario, and a first depth map corresponding to the color image; a second obtaining module, configured to obtain a first optical flow between the color image and the infrared image; and a third obtaining module, configured to perform first optimization processing on the first depth map by using the first optical flow to obtain an optimized second depth map corresponding to the color image.

According to a third aspect of the present disclosure, an electronic device is provided, including: a processor; and a memory configured to store processor-executable instructions; where the processor is configured to execute any of the operations in the method according to the first aspect.

According to a fourth aspect of the present disclosure, a computer-readable storage medium is provided, which has computer program instructions stored thereon, where the computer program instructions, when being executed by a processor, enable the processor to implement the method according to any of the operations in the first aspect.

BRIEF DESCRIPTION OF THE DRAWINGS

It should be understood that the foregoing general descriptions and the following detailed descriptions are merely exemplary and explanatory, but are not intended to limit the present disclosure. Other features and aspects of the present disclosure can be described more clearly according to the detailed descriptions of the exemplary embodiments in the accompanying drawings.

The accompanying drawings here are incorporated into the specification and constitute a part of the specification. These accompanying drawings show embodiments that conform to the present disclosure, and are intended to describe the technical solutions in the present disclosure together with the specification.

DETAILED DESCRIPTION

Figure 1:
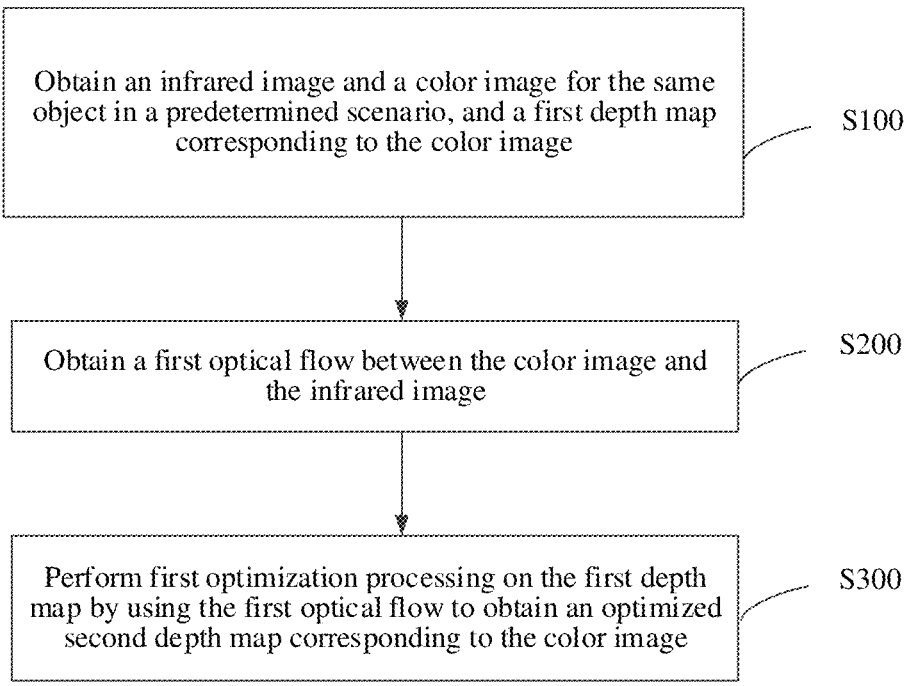
FIG. 1 is a flowchart of an image processing method according to embodiments of the present disclosure.

The various exemplary embodiments, features, and aspects of the present disclosure are described below in detail with reference to the accompanying drawings. Same reference numerals in the accompanying drawings represent elements with same or similar functions. Although various aspects of the embodiments are illustrated in the accompanying drawings, the accompanying drawings are not necessarily drawn in proportion unless otherwise specified.

The special term "exemplary" here refers to "being used as an example, an embodiment, or an illustration". Any embodiment described as "exemplary" here should not be explained as being more superior or better than other embodiments.

The term "and/or" herein only describes an association relation between associated objects, indicating that three relations may exist, for example, A and/or B may indicate three conditions, i.e., A exists separately, A and B exist at the same time, and B exists separately. In addition, the term "at least one" herein indicates any one of multiple listed items or any combination of at least two of multiple listed items. For example, including at least one of A, B, or C may indicate including any one or more elements selected from a set consisting of A, B, and C.

In addition, numerous details are given in the following detailed description for the purpose of better explaining the present disclosure. It should be understood by persons skilled in the art that the present disclosure can still be implemented even without some of those details. In some of the examples, methods, means, elements, and circuits that are well known to persons skilled in the art are not described in detail so that the principle of the present disclosure becomes apparent.

The embodiments of the present disclosure provide an image processing method. The method may be used in a camera device or an image processing device, which can perform the determination of an optical flow through the collected color image and infrared image, and optimize the depth map according to the determined optical flow, thereby facilitating the accurate registration of the depth map and the color image and improving the accuracy of the depth map. In addition, the embodiments of the present disclosure may be implemented through a neural network, or may be implemented through a corresponding algorithm.

FIG. 1 is the flowchart of an image processing method according to embodiments of the present disclosure, where the image processing method in the embodiments of the present disclosure includes the following steps.

S100: An infrared image and a color image for the same object in a predetermined scenario, and a first depth map corresponding to the color image are obtained.

The image processing method may be applied to a camera device such as a camera, for example, the camera device may be a ToF RGB-D camera (Time of Flight camera), or the method in the embodiments of the present disclosure may also be applied to an electronic device with a camera function or an image processing function, such as a mobile phone, a PAD, and a notebook computer. Any device with the image processing function or the camera function can apply the method provided in the embodiments of the present disclosure. The examples are not illustrated in the present disclosure one by one.

In step S100, the infrared image (IR image), the color image (RGB image), and the first depth map obtained in the embodiments of the present disclosure may be obtained by the camera device under the condition of one exposure. The features of the infrared image, color image, and first depth map obtained under this condition are in one-to-one correspondence, and the scenarios corresponding to the obtained IR image, RGB image, and the first depth map are the same and objects included therein are also the same. That is, the RGB image, the IR image, and the first depth map obtained in the embodiments of the present disclosure may be represented as different information of the same image, but there is a deviation between the different information due to the influence of photographing parameters and the external environment or the motion state of the subject. The purpose of the embodiments of the present disclosure is to reduce the deviation and implement accurate alignment of the depth map and the color image. That is, the features of the infrared image, the color image, and the first depth map obtained in the embodiments of the present disclosure are in one-to-one correspondence and the scales are also the same. In the infrared image, the color image, and the first depth map, elements at the same position represent information (such as RGB information, infrared information, and depth information) of the same pixel point.

In addition, in the embodiments of the present disclosure, the manner of obtaining the infrared image, the color image, and the corresponding first depth map may be obtaining directly through the camera device, or may also be transmitting the infrared image, the color image, and the corresponding first depth map obtained by the camera device to a device that applies the method in the embodiments of the present disclosure by means of communication transmission. No limitation is made thereto in the present disclosure. The specific manner can be determined according to different application scenarios and requirements.

S200: a first optical flow between the color image and the infrared image is obtained.

The optical flow can be used to express changes in images, and because it includes information about the motion of a target object, it can be used to determine the motion situation of the target object. In the embodiments of the present disclosure, according to the obtained color image and infrared image, an optical flow change between the two is obtained, and a corresponding first optical flow is obtained, or optimization processing may be performed according to the determined optical flow change to obtain a first optical flow with higher accuracy. Then, the obtained optical flow may be used to optimize the depth information of the color image.

S300: first optimization processing is performed on the first depth map by using the first optical flow to obtain an optimized second depth map corresponding to the color image.

In the embodiments of the present disclosure, optimization processing may be performed on the first depth map according to the obtained first optical flow, to obtain a depth map having a higher registration degree with the color image, i.e., the second depth map. In some embodiments of the present disclosure, the second depth map corresponding to the first depth map may be obtained according to the deviation of each pixel point corresponding to the first optical flow. In some other embodiments, a neural network may also be used to perform optimization processing on the depth map, and no limitation is made thereto in the present disclosure.

The obtained optimized second depth map is be more accurately registered with the color image, that is, the depth information corresponding to each pixel of the color image is obtained more accurately, so that processing such as blurring, large aperture, and small aperture may be accurately performed on the color image.

Each process of the embodiments of the present disclosure is described in detail below.

In step S100, it is the camera device which applies the method in the embodiments of the present disclosure; accordingly, the obtained infrared image, color image, and corresponding first depth map may be directly obtained by the camera device under one exposure. Subsequent processing may be directly performed on the collected information in the embodiments of the present disclosure.

In some other possible implementations, the obtained infrared image, color image, and corresponding first depth map may be stored in a server or other devices, and the device applying the method in the embodiments of the present disclosure may obtain required image data from the server or other devices. That is, the infrared image, the color image, and the corresponding first depth map in the embodiments of the present disclosure may be collected by the camera device in real time, and may also be stored by the camera device obtained in other ways. No specific limitation is made thereto in the present disclosure.

After step S100, step S200 may be performed to obtain the first optical flow from the RGB image to the infrared image, that is, the position change of the corresponding pixel point from the infrared image to the RGB image may be obtained. The elements in the first optical flow may be dual-channel, which respectively represent changes in the x-axis and y-axis of a corresponding pixel, i.e., the position deviation of the corresponding pixel point.

In some possible embodiments of the present disclosure, step S200 of obtaining the first optical flow between the color image and the infrared image includes: inputting the infrared image and the color image to an optical flow estimation model, and obtaining the first optical flow from the color image to the infrared image by using the optical flow estimation model.

The image processing method in the embodiments of the present disclosure may be implemented through a neural network model, for example, each process may be performed through a deep learning neural network. The neural network may include an optical flow estimation model for determining the first optical flow between the infrared image and the color image, for example, the optical flow estimation model may be a C-type optical flow network (FlowNetC). Alternatively, in other possible embodiments, the first optical flow may also be obtained through other optical flow estimation models, and no specific limitation is made thereto in the embodiments of the present disclosure.

In some other possible embodiments, optimization processing may also be performed on the optical flow obtained through the optical flow estimation model to obtain the first optical flow subjected to optimization processing.

Figure 2:
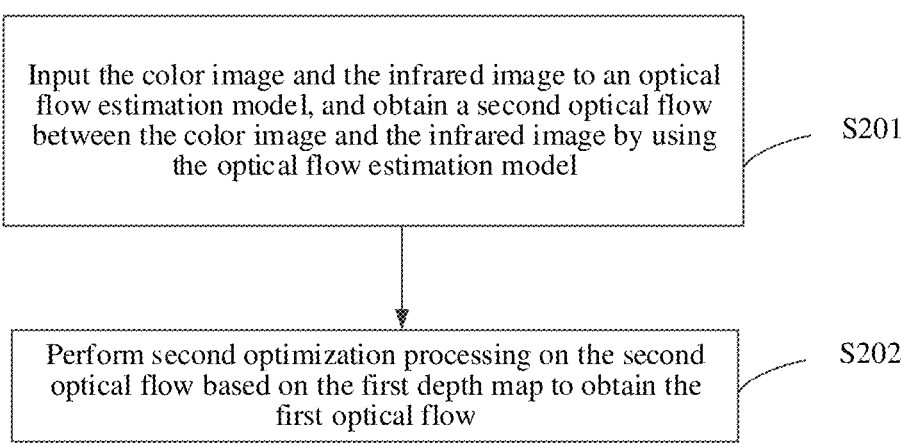
FIG. 2 is a flowchart of step S200 in an image processing method according to embodiments of the present disclosure.

FIG. 2 is a flowchart of step S200 in an image processing method according to embodiments of the present disclosure, where obtaining the first optical flow between the color image and the infrared image (step S200) includes the following steps.

S201: The color image and the infrared image are input to an optical flow estimation model, and a second optical flow between the color image and the infrared image is obtained by using the optical flow estimation model.

In the embodiments of the present disclosure, the optical flow between the color image and the infrared image, i.e., the second optical flow (the same as the first optical flow in the above embodiments) may be obtained through the optical flow estimation model. The second optical flow may represent a position offset of each pixel point between the color image and the infrared image. After the second optical flow is obtained, the optical flow may further be optimized in combination with the first depth map to improve the accuracy of the optical flow in the embodiments of the present disclosure.

S202: Second optimization processing is performed on the second optical flow based on the first depth map to obtain the first optical flow.

After the second optical flow is obtained, the second optimization processing may be performed on the second optical flow to obtain the first optical flow. In the embodiments of the present disclosure, the second optical flow and the first depth map may be used to estimate predetermined parameters of the camera device, so as to further obtain an optimized first optical flow.

Figure 3:
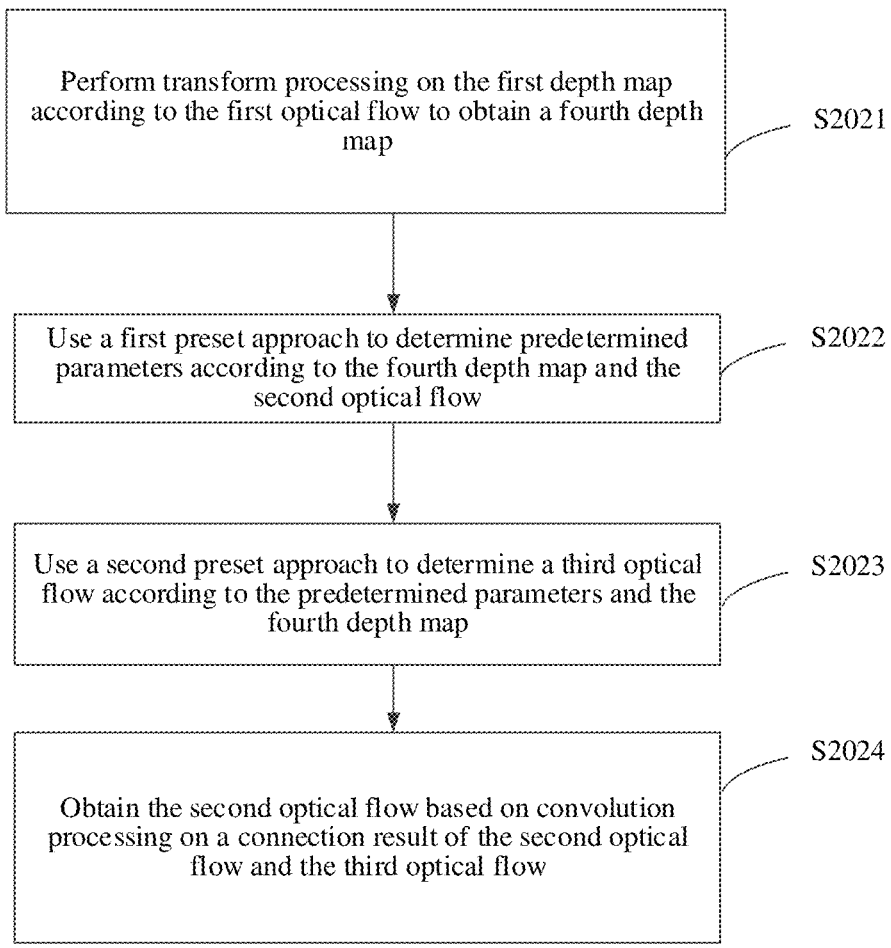
FIG. 3 is a flowchart of step S202 in an image processing method according to embodiments of the present disclosure.

FIG. 3 is a flowchart of step S202 in an image processing method according to embodiments of the present disclosure, where performing second optimization processing on the second optical flow based on the first depth map to obtain the first optical flow (step S202) includes the following steps.

S2021: Transform processing is performed on the first depth map according to the first optical flow to obtain a fourth depth map.

In the embodiments of the present disclosure, correction (transform processing) may be performed on the first depth map according to the second optical flow obtained by the optical flow estimation model to obtain the fourth depth map. Because the position change and motion state between the RGB image and the IR image (infrared image) may be expressed as the second optical flow, and accordingly, the corresponding fourth depth of the first depth map in the case of the change in the second optical flow may be obtained, so as to obtain the fourth depth map. According to the position change of the corresponding pixel point in the second optical flow, the position change of the depth information of the corresponding pixel point in the first depth map may be obtained to obtain the fourth depth map.

S2022: A first preset manner is used to determine predetermined parameters according to the fourth depth map and the second optical flow.

In the embodiments of the present disclosure, the predetermined parameters may be obtained according to the first preset manner, and the predetermined parameters may be real-time parameters of the camera device, such as the position of the optical center and the position of the principal point. Because in an actual application process, the real-time parameters of the camera device may be different from factory settings according to the use conditions and changes in the external photographing environment, it may be necessary to estimate the real-time parameters of the camera device so as to optimize the second optical flow.

The expression of the first preset manner is:

$$\{T_x^*, T_y^*, \xi_x^*, \xi_y^*\} = \underset{T_x, T_y, \xi_x, \xi_y}{\mathrm{argmin}} \sum_p \left\| \begin{pmatrix} V_x^0 \\ V_y^0 \end{pmatrix} - \begin{pmatrix} \frac{T_x}{D'(p)} + \xi_x \\ \frac{T_y}{D'(p)} + \xi_y \end{pmatrix} \right\|^2$$

where $V_x^0$ is an x value corresponding to each pixel point in the second optical flow; $V_y^0$ is a y value corresponding to each pixel point in the second optical flow; $D'(p)$ is depth information of a pixel point p in the fourth depth map; $T_x$ and $T_y$ respectively represent displacement parameters of a camera device in the x direction and the y direction with respect to the optical center; $\xi_x$ and $\xi_y$ respectively represent x and y parameters corresponding to the position of the principal point of the camera device; $T_x^*, T_y^*, \xi_x^*, \xi_y^*$ are estimate values of $T_x$, $T_y$, $\xi_x$, and $\xi_y$, respectively.

Therefore, through the above-mentioned first preset manner, estimate values of the real-time predetermined parameters (the position of the principal point and the position of the optical center) of the camera device are obtained, and the second optical flow is further optimized based on the estimated values.

S2023: A second preset manner is used to determine a third optical flow according to the predetermined parameter and the fourth depth map.

The third optical flow obtained based on the real-time predetermined parameters may be determined after the estimate values of the photographing parameters are obtained. The third optical flow combines the real-time status of the predetermined parameters, thereby improving the optimization accuracy of the optical flow.

The expression of the second preset manner is:

$$V = \begin{pmatrix} \frac{T_x^*}{D'(p)} + \xi_x^* \\ \frac{T_y^*}{D'(p)} + \xi_y^* \end{pmatrix}$$

where V represents the third optical flow; $T_x^*, T_y^*, \xi_x^*, \xi_y^*$ are estimate values of $T_x$, $T_y$, $\xi_x$, and $\xi_y$, respectively; $T_x$ and $T_y$ respectively represent displacement parameters of a camera device in the x direction and the y direction with respect to the optical center; $\xi_x$ and $\xi_y$ respectively represent x and y parameters corresponding to the position of the principal point of the camera device; and D'(p) is depth information of a pixel point p in the fourth depth map.

Through the second preset manner, the third optical flow determined based on the estimate values of the predetermined parameter of the camera device and the fourth depth map may be achieved. The third optical flow includes real-time photographing parameter information of the camera device.

S2024: The second optical flow is obtained based on convolution processing on a connection result of the second optical flow and the third optical flow.

After the third optical flow is obtained, connection processing is performed on the second optical flow and the third optical flow to obtain a new optical flow in which the initial second optical flow and the third optical flow of the photographing parameters are fused, convolution processing is performed on the connection result at least once, feature fusion is performed on the new optical flow, and the optimized first optical flow is further obtained.

Figure 4:
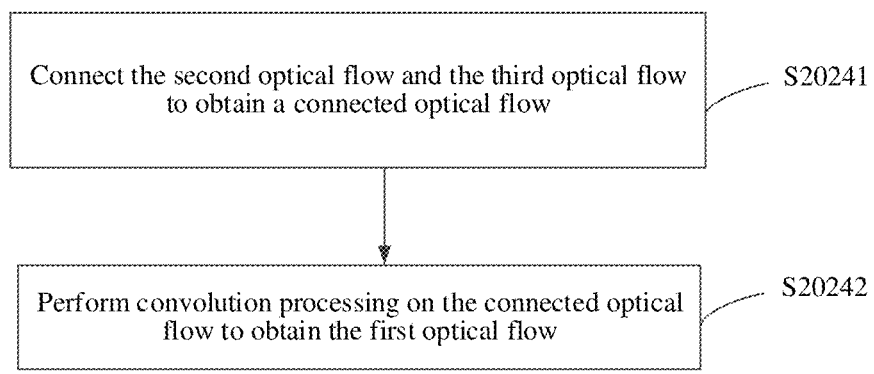
FIG. 4 is a flowchart of step S2024 in an image processing method according to embodiments of the present disclosure.

FIG. 4 is a flowchart of step S2024 in an image processing method according to embodiments of the present disclosure. Obtaining the first optical flow based on the convolution processing on the connection result of the second optical flow and the third optical flow (step S2024) includes the following steps.

S20241: The second optical flow and the third optical flow are connected to obtain a connected optical flow.

The connection processing of the second optical flow and the third optical flow in the embodiments of the present disclosure refers to connecting the second optical flow and the third optical flow in a channel direction of the optical flow; the features of the initial second optical flow and the third optical flow including the photographing parameters of the camera device are fused in the connected optical flow obtained by connection processing. In this way, the parameters of the camera device can be conveniently fused with the features of the initial second optical flow.

S3042: Convolution processing is performed on the connected optical flow to obtain the first optical flow.

In this embodiment, convolution processing is performed at least once on the connected optical flow fused with the camera device parameters (predetermined parameters). The convolution processing may achieve the further fusion of the above features and further optimization of the optical flow, so that the accuracy of the obtained first optical flow is higher. A convolution kernel used in the convolution processing may be a 1*1 convolution kernel or a 3*3 convolution kernel, or a predetermined step size (such as 2) may be used to perform the convolution processing. However, no specific limitation is made thereto in the present disclosure, and settings may be performed specifically according to requirements. The scale of the obtained new first optical flow is the same as that of the original first optical flow, and the both are in a dual-channel form.

Through the method in the embodiments of the present disclosure, the first optical flow between the color image and the infrared image may be obtained by using the two, where the determination of the first optical flow may be implemented directly according to the optical flow estimation model, and the obtained optical flow may be optimized according to the second optimization processing to improve the accuracy of the optical flow. After the first optical flow subjected to the second optimization processing is obtained, the first optimization processing may be performed on the first depth map according to the first optical flow.

Figure 5:
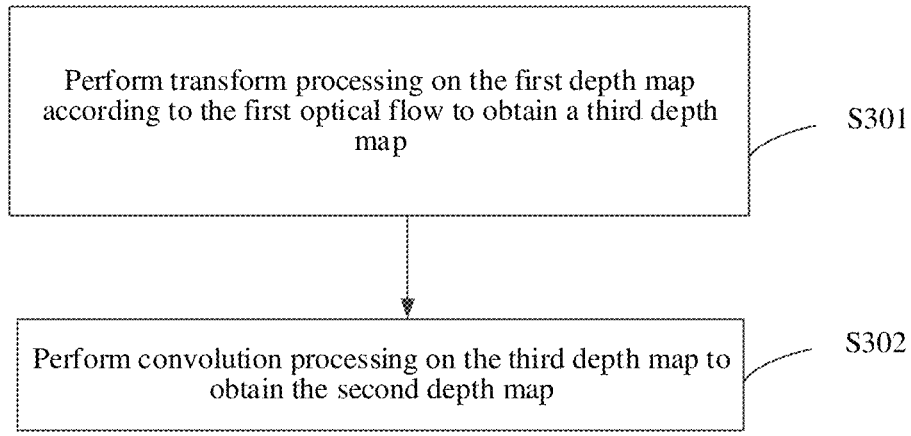
FIG. 5 is a flowchart of step S300 in an image processing method according to embodiments of the present disclosure.

FIG. 5 is a flowchart of step S300 in an image processing method according to embodiments of the present disclosure.

In some possible implementations, performing first optimization processing on the first depth map by using the first optical flow to obtain the optimized second depth map corresponding to the color image (step S300) includes the following steps.

S301: Transform processing is performed on the first depth map according to the first optical flow to obtain a third depth map.

The optimized first optical flow may be obtained through step S200. The first optical flow is fused with the real-time photographing parameters of the camera device. Based on the position change of each pixel corresponding to the first optical flow, a calibration result corresponding to the first depth map, i.e., the third depth map, may be obtained. For example, the third depth map is obtained by performing transform processing on the position of the depth information of the pixel point corresponding to the first depth map according to the position change corresponding to the second optical flow, and the third depth map obtained in this way is fused with real-time parameter information of the camera device.

S302: Convolution processing is performed on the third depth map to obtain the second depth map.

After the third depth map is obtained, convolution processing may be performed on the third depth map in the embodiments of the present disclosure, for example, the convolution processing may be performed through a 1*1 convolution kernel, or the convolution processing may also be performed through a 3*3 convolution kernel to obtain the second depth map. As long as convolution and feature optimization for the depth map can be performed, the method can be used as an embodiment of the present disclosure. No limitation is made thereto in the present disclosure.

In addition, in the embodiments of the present disclosure, the first depth map may be connected to the third depth map to obtain a connected depth map, and conventional processing may be performed on the connected depth map to obtain the second depth map.

In the embodiments of the present disclosure, the obtained third depth map may be connected to the initial first depth map to obtain a connected depth map including the real-time parameters of the camera device. Similarly, the connection processing may also be performing a connection in a channel direction. The neural network in the embodiments of the present disclosure may further include a depth fusion network module. The depth fusion network module may include at least one convolution unit, which may perform convention processing at least once by inputting the connected depth map to the depth fusion network module. The convolution kernel of each convolution unit may be the same or different, for example, it may be the 1*1 convolution kernel or the 3*3 convolution kernel. No specific limitation is made thereto in the present disclosure. Selections and settings may be performed by a person skilled in the art according to requirements. The scale of the obtained optimized second depth map is the same as that of the first depth map, and the second depth map may have depth information with higher accuracy, so that the second depth map may be more accurately aligned with the RGB image.

Figure 6:
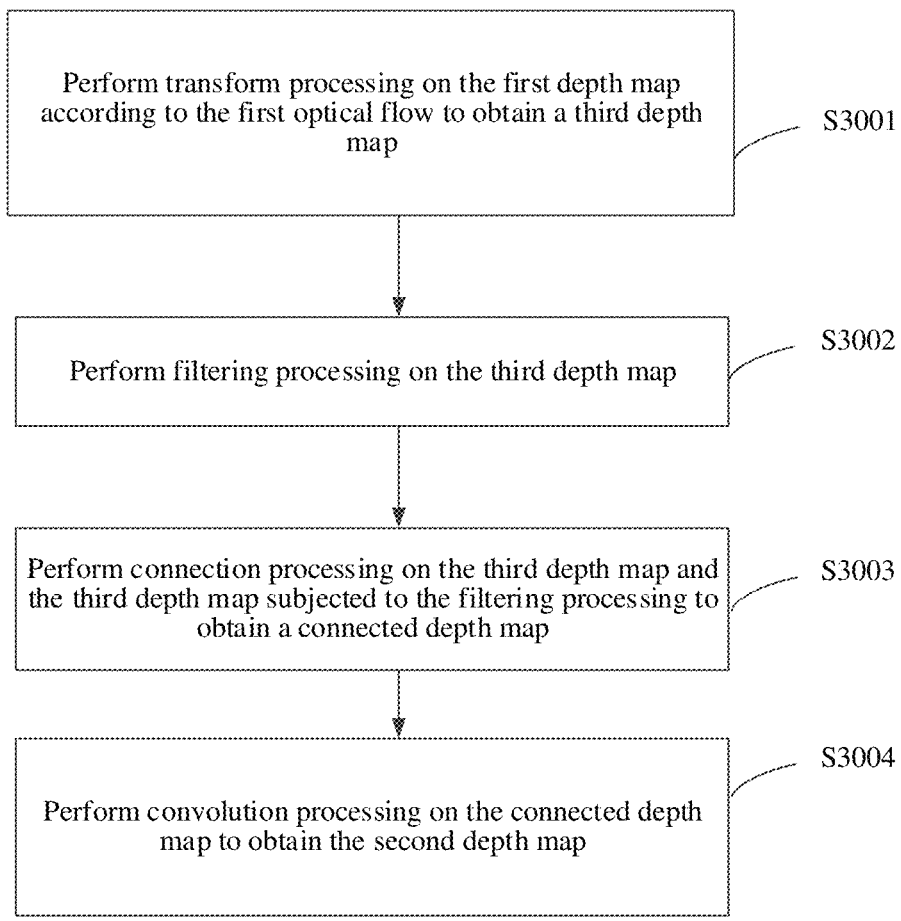
FIG. 6 is another flowchart of step S300 in an image processing method according to embodiments of the present disclosure.

In some other embodiments of the present disclosure, filtering processing may also be performed on the third depth map obtained in the embodiments of the present disclosure, so that the accuracy of the depth map may be further improved. FIG. 6 is another flowchart of step S300 in an image processing method according to embodiments of the present disclosure. Step S300 in the embodiments of the present disclosure includes the following steps.

S3001: Transform processing is performed on the first depth map according to the first optical flow to obtain a third depth map.

The process of step S3001 is the same as that of step S301. Descriptions are not made here repeatedly.

S3002: Filtering processing is performed on the third depth map.

After the third depth map is obtained, step S3002 may also be performed in the embodiments of the present disclosure to perform filtering processing on the third depth map. For example, edge filtering processing may be performed, so that depth information of an edge pixel point may be optimized, so as to improve the accuracy of the third depth map, where the manner of the edge filtering processing may be implemented by using existing technical means. No specific limitation is made thereto in the embodiments of the present disclosure.

S3003: Connection processing is performed on the third depth map and the third depth map subjected to the filtering processing to obtain a connected depth map.

Similarly, connection processing may be performed on the third depth map subjected to the filtering processing and the third depth map to obtain the connected depth map including the real-time parameters of the camera device. The connection processing may also be performing a connection in a channel direction. By means of the connection processing, the accuracy of the depth information may be improved while retaining the comprehensiveness of the depth information.

S3004: Convolution processing is performed on the connected depth map to obtain the second depth map.

As stated above, the depth fusion network module in the neural network in the embodiments of the present disclosure may be used to perform one convolution process at least once to connect the depth map, where a 1*1 convolution kernel may be used, or a 3*3 convolution kernel may be used to perform the convolution processing. No specific limitation is made thereto in the present disclosure. Selections and settings may be performed by a person skilled in the art according to requirements. The scale of the obtained optimized second depth map is the same as that of the first depth map, and the second depth map may have depth information with higher accuracy, so that the second depth map may be more accurately aligned with the RGB image.

By means of the above embodiments, it is possible to obtain a second depth map capable of having a higher registration degree with RGB image, that is, the second depth map has more accurate depth information.

After the depth information of the second depth map is obtained, a processing operation for a color image may be performed according to the second depth map in the embodiments of the present disclosure, for example, blurring processing may be performed on the color image according to the second depth map in the embodiments of the present disclosure.

Figure 7:
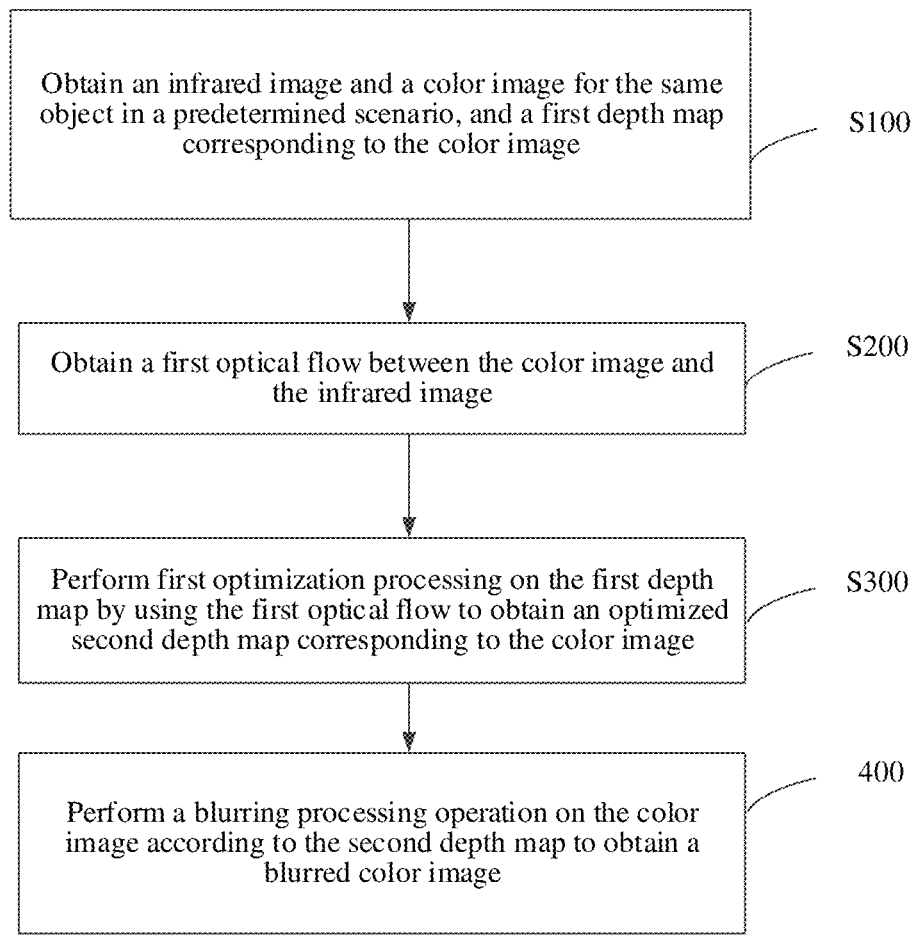
FIG. 7 is another flowchart of an image processing method according to embodiments of the present disclosure.

FIG. 7 is another flowchart of an image processing method according to embodiments of the present disclosure, where the method includes:

S100: obtaining an infrared image and a color image for the same object in a predetermined scenario, and a first depth map corresponding to the color image;

S200: obtaining a first optical flow between the color image and the infrared image;

S300: performing first optimization processing on the first depth map by using the first optical flow to obtain an optimized second depth map corresponding to the color image; and S400: performing blurring processing on the color image according to the second depth map to obtain a blurred color image.

In the embodiments of the present disclosure, steps S100 to S300 are the same as the process in the above embodiments, and details are not described here again. After the second depth map is obtained, a blurring processing operation may also be performed on the color image according to the depth information of each pixel point in the second depth image in the embodiments of the present disclosure.

A first pixel point whose depth value in the second depth map is higher than a depth threshold may be determined, and blurring processing is performed on a position area corresponding to the first pixel point in the color image to implement background blurring of the color image.

Alternatively, in some other embodiments of the present disclosure, a second pixel point whose depth value in the second depth map is less than or equal to the depth threshold, and blurring processing is performed on a position region corresponding to the second pixel point in the color image to implement foreground blur or face blurring. The depth threshold may be set according to different scenarios and different requirements. No specific limitation is made thereto in the embodiments of the present disclosure. The following describes the training process of the neural network in the embodiments of the present disclosure. The neural network in the embodiments of the present disclosure may include a first network module and a second network module, where the first network module may be configured to perform steps S100-S200, and the second network module may be configured to perform step S300.

Figure 8:
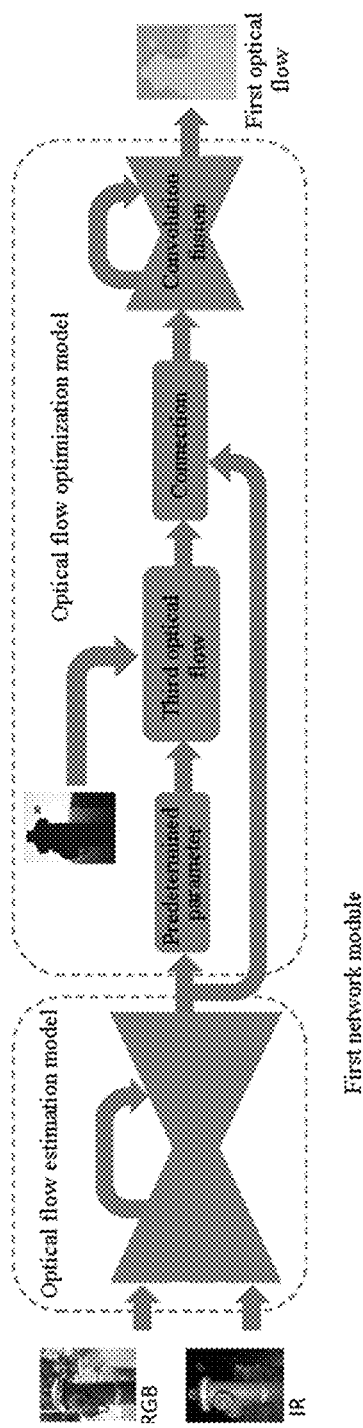
FIG. 8 is a block diagram of a first network module according to embodiments of the present disclosure.
Figure 9:
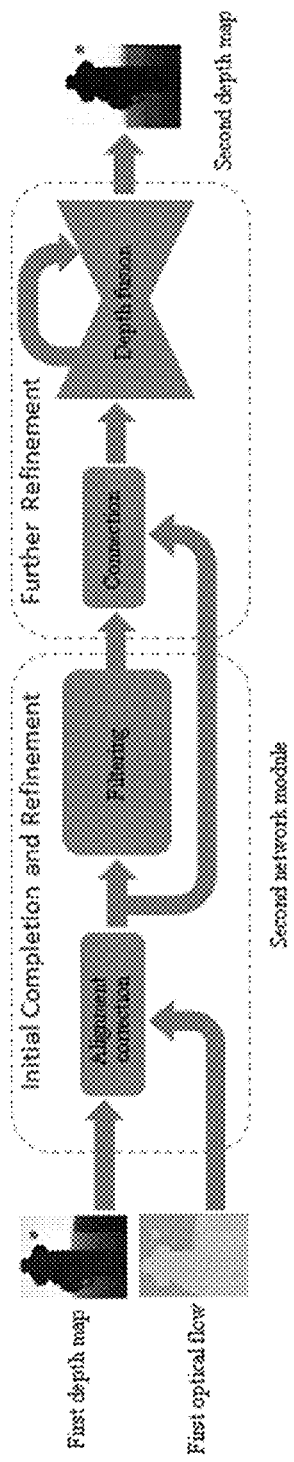
FIG. 9 is a block diagram of a second network module according to embodiments of the present disclosure.

FIG. 8 is a block diagram of a first network module according to embodiments of the present disclosure; FIG. 9 is a block diagram of a second network module according to embodiments of the present disclosure; the neural network in the embodiments of the present disclosure may be constituted by the two types of modules.

Before actual applications, it is necessary to train the neural network. The following describes the training process of the first network module.

Figure 10:
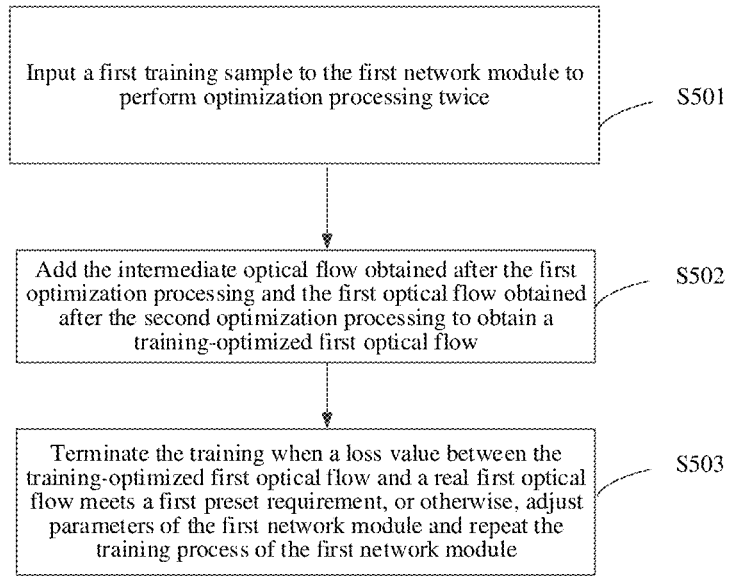
FIG. 10 is a flowchart of training a first network module according to embodiments of the present disclosure.

FIG. 10 is a flowchart of training an optical flow optimization model according to embodiments of the present disclosure, where the step of training the first network module includes the following steps.

S501: A first training sample is input to the first network module to perform optimization processing twice, where the first training sample includes multiple groups of color image samples, infrared image samples, and first depth map samples corresponding to the color image samples.

When training the optical flow optimization model, the training sample may be input into the model, and the training sample may multiple groups of samples; each group of samples may include a corresponding sampled image sample, a first IR image sample, and a first depth map sample, and may also include a real first optical flow sample (serving as a supervised sample).

In the embodiments of the present disclosure, when training the first network module, two optimization processing operations may be used to optimize the first network module. An intermediate optical flow between the color image sample and the first infrared image sample is obtained through the first optimization processing, and a first optical flow between the color image sample and the first infrared image sample is obtained through the second optimization processing.

In some possible implementations, during the first optimization processing, the first IR image sample and the RGB image sample may be first input to an optical flow estimation model of the first network module, for obtaining an intermediate optical flow between the color image sample and the infrared image sample.

Alternatively, in some other embodiments of the present disclosure, during the first optimization processing, the first IR image sample and the RGB image sample may also be first input to the optical flow estimation model of the first network module, for obtaining a second optical flow between the color image sample and the infrared image sample. Moreover, the second optical flow and the first depth map are input into the optical flow optimization model of the first network module to obtain an intermediate optical flow corresponding to the second optical flow. The manner of determining the intermediate optical flow may be determined according to the process of the above embodiments for determining the first optical flow. Details are not described here again.

During the second optimization processing, the intermediate optical flow between the first infrared image sample and the color image sample may be used to perform correction processing on the first infrared image sample to obtain a second infrared image sample; and the color image sample, the corresponding first depth map sample, and the second infrared image sample in the training sample are input to the first network module, and the second optimization processing is performed to obtain the first optical flow between the first infrared image sample and the color image sample.

That is, in the second optimization process, correction processing may be performed on the first IR image based on the intermediate optical flow, that is, a second IR image corresponding to a position change of the first IR image sample with respect to the intermediate optical flow may be obtained. Moreover, the second IR image and the RGB image samples are input to the first network module, to re-obtain the optical flow between the two, i.e., the first optical flow corresponding to the sample. The sample size may be increased and the optimization accuracy may be improved through the two optimization processes.

S502: The intermediate optical flow obtained after the first optimization processing and the first optical flow obtained after the second optimization processing are added to obtain a training-optimized first optical flow.

Further, in the embodiments of the present disclosure, the intermediate optical flow between the RGB image subjected to the first optimization processing and the first IR image and the first optical flow obtained after the second optimization processing may be elementally added to obtain a training-optimized first optical flow. The addition here refers to respectively adding x values and y values of corresponding pixels to obtain the training-optimized first optical flow.

S503: The training is terminated when a loss value between the training-optimized first optical flow and a real first optical flow meets a first preset requirement, or otherwise, parameters of the first network module are adjusted and the training process of the first network module is repeated.

In the training process, the trained first optical flow may be compared with the real first optical flow to obtain the loss value; if the loss value is less than a preset loss threshold, the first preset requirement is satisfied, and if the loss value is greater than or equal to the first loss threshold, the parameters of the first network module need to be adjusted until the first preset requirement is satisfied.

Figure 11:
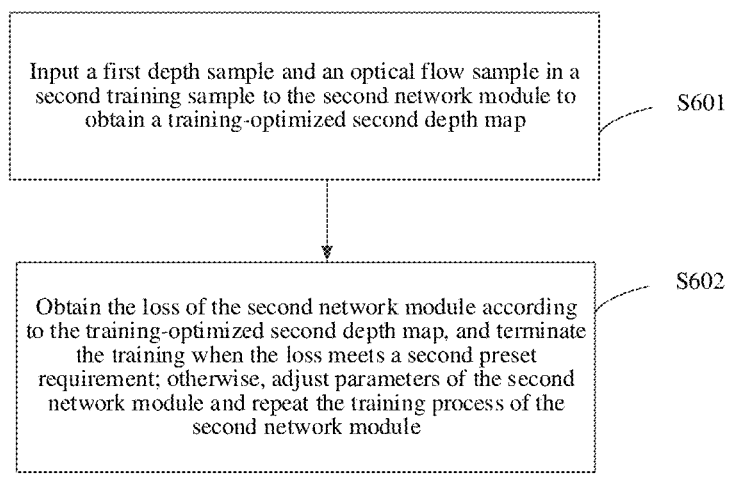
FIG. 11 is a flowchart of training a second network module according to embodiments of the present disclosure.

In addition, a second network module may also be trained in the embodiments of the present disclosure. FIG. 11 is a flowchart of training a second network module according to embodiments of the present disclosure, where the step of training the second network module includes the following steps.

S601: A first depth sample and an optical flow sample in a second training sample are input to the second network module to obtain a training-optimized second depth map.

In the embodiments of the present disclosure, the second network module may be trained by using the second training sample. The second training sample may include multiple groups of samples, and each group of samples may include a corresponding first depth map sample and an optical flow sample. The optical flow sample may be an optical flow between an RGB image and an IR image corresponding to the first depth map sample. Furthermore, each group of samples may also include a real depth map sample configured to supervise the optimized second depth map. When training the second network module, the optical flow sample and the first depth sample may be input to a depth optimization model of the second network module. The optimization process of the first depth sample may be performed, and specifically, reference may be made to the process of step S300 to obtain the optimized second depth map. S602: The loss of the second network module is obtained according to the training-optimized second depth map, and the training is terminated when the loss meets a second preset requirement; otherwise, parameters of the second network module are adjusted and the training process of the second network module is repeated.

After the optimized second depth map is obtained, the real depth map samples may be compared with the optimized second depth map to obtain a corresponding loss value, and the process of optimizing the second network module is selected based on the loss value.

If the loss value is less than a second loss threshold, it is determined that the second preset requirement is satisfied, and in this case, the training is terminated; if the loss value is greater than or equal to the second loss threshold, the parameters of the second network module, such as the parameters of the depth optimization model, need to be adjusted, and steps S601 and S602 are repeatedly performed until the obtained loss value is less than the second loss threshold. The first loss threshold and the second loss threshold are both self-set values, and a person skilled in the art may set the values according to requirements. No limitation is made thereto in the present disclosure.

In conclusion, in the embodiments of the present disclosure, depth information is optimized by using optical flow information, so as to achieve precise registration of the depth information and a color image. Therefore, the problems of poor registration due to the perturbation of camera parameters and the inability to normally use the depth map can be solved. Moreover, in the embodiments of the present disclosure, by optimizing the optical flow and determining the real-time parameters of the camera device by using the optimized optical flow to perform the optimization of the depth map, the alignment degree between the depth map and the color image can be improved.

It should be understood that the foregoing various method embodiments mentioned in the present disclosure may be combined with each other to form a combined embodiment without departing from the principle logic. Details are not described herein again due to space limitation.

In addition, the present disclosure further provides an image processing apparatus, an electronic device, a computer-readable storage medium, and a program, which can all be used to implement any of the image processing methods provided by the present disclosure. For the corresponding technical solutions and descriptions, please refer to the corresponding contents in the method section. Details are not described again.

A person skilled in the art could understand that, in the foregoing methods of the specific implementations, the order in which the steps are written does not imply a strict execution order which constitutes any limitation to the implementation process, and the specific order of executing the steps should be determined by functions and possible internal logics thereof.

Figure 12:
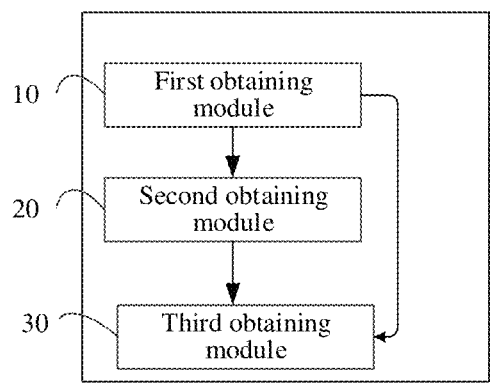
FIG. 12 is a block diagram of an image processing apparatus according to embodiments of the present disclosure.

FIG. 12 is a block diagram of an image processing apparatus according to embodiments of the present disclosure. As shown in FIG. 12, the image processing apparatus includes:

a first obtaining module 10, configured to obtaining an infrared image and a color image for the same object in a predetermined scenario, and a first depth map corresponding to the color image;

a second obtaining module 20, configured to obtain a first optical flow between the color image and the infrared image; and a third obtaining module 30, configured to perform first optimization processing on the first depth map by using the first optical flow to obtain an optimized second depth map corresponding to the color image.

In some possible implementations, the third obtaining module is further configured to perform transform processing on the first depth map according to the first optical flow to obtain a third depth map, and perform convolution processing on the third depth map to obtain the second depth map.

In some possible implementations, the third obtaining module is further configured to perform transform processing on the first depth map according to the first optical flow to obtain a third depth map, and
  perform filtering processing on the third depth map;
  perform connection processing on the third depth map and the third depth map subjected to the filtering processing to obtain a connected depth map; and
  perform convolution processing on the connected depth map to obtain the second depth map.

In some possible implementations, the second obtaining module is further configured to input the color image and the infrared image to an optical flow estimation model, and obtain the first optical flow between the color image and the infrared image by using the optical flow estimation model.

In some possible implementations, the second obtaining module is further configured to: input the color image and the infrared image to an optical flow estimation model, and obtain a second optical flow between the color image and the infrared image by using the optical flow estimation model; and perform second optimization processing on the second optical flow based on the first depth map to obtain the first optical flow.

In some possible implementations, the second obtaining module is further configured to: perform transform processing on the first depth map according to the first optical flow to obtain a fourth depth map;
  use a first preset manner to determine predetermined parameters according to the fourth depth map and the second optical flow;
  use a second preset manner to determine a third optical flow according to the predetermined parameters and the fourth depth map; and
  obtain, based on the convolution processing on a connection result of the second optical flow and the third optical flow, the first optical flow for the optimization processing of the second optical flow.

In some possible implementations, the second obtaining module is further configured to connect the second optical flow and the third optical flow to obtain a connected optical flow, and perform convolution processing on the connected optical flow to obtain the first optical flow.

In some possible implementations, the second obtaining module is configured to obtain the first optical flow between the color image and the infrared image through a first network module, and a step of training the first network module includes:
  inputting a first training sample to the first network module to perform optimization processing twice, the first training sample including a color image sample, a first infrared image sample, and a first depth map sample corresponding to the color image sample, where an intermediate optical flow between the color image sample and the first infrared image sample is obtained through the first optimization processing, and a first optical flow between the color image sample and the first infrared image sample is obtained through the second optimization processing;
  adding the intermediate optical flow obtained after the first optimization processing and the first optical flow obtained after the second optimization processing to obtain a training-optimized first optical flow; and
  terminating the training when a loss value between the training-optimized first optical flow and a real first optical flow meets a first preset requirement, or otherwise, adjusting parameters of the first network module and repeating the training process of the first network module.

In some possible implementations, the second obtaining module is further configured to: input the color image sample, the first infrared image sample, and the first depth map sample corresponding to the color image sample in the first training sample to the first network module, and perform the first optimization processing to obtain the intermediate optical flow between the first infrared image sample and the color image sample;
  perform correction processing on the first infrared image sample by using the intermediate optical flow between the infrared image sample and the color image sample to obtain a second infrared image sample; and
  input the color image sample and the first depth map sample corresponding to the color image sample in the first training sample, and the second infrared image sample to the first network module, and perform the second optimization processing to obtain the first optical flow between the first infrared image sample and the color image sample.

In some possible implementations, the third obtaining module is further configured to perform the first optimization processing on the first depth map by using the first optical flow through a second network module to obtain the second depth map, and a step of training the second network module includes: inputting a first depth sample and an optical flow sample in a second training sample to the second network module to obtain a training-optimized second depth map;

obtaining the loss of the second network module according to the training-optimized second depth map;

terminating the training when the loss meets a second preset requirement; and otherwise, adjusting parameters of the second network module and repeating the training process of the second network module.

In some possible implementations, the expression of the first preset manner is:

$$\{T_x^*, T_y^*, \xi_x^*, \xi_y^*\} = \underset{T_x, T_y, \xi_x, \xi_y}{\operatorname{argmin}} \sum_p \left\| \begin{pmatrix} V_x^0 \\ V_y^0 \end{pmatrix} - \begin{pmatrix} \frac{T_x}{D'(p)} + \xi_x \\ \frac{T_y}{D'(p)} + \xi_y \end{pmatrix} \right\|^2$$

where $V_x^0$ is an x value corresponding to each pixel point in the second optical flow; $V_y^0$ is a y value corresponding to each pixel point in the second optical flow; D'(p) is depth information of a pixel point p in the fourth depth map; $T_x$ and $T_y$ respectively represent displacement parameters of a camera device in the x direction and the y direction with respect to the optical center; $\xi_x$ and $\xi_y$ respectively represent x and y parameters corresponding to the position of the principal point of the camera device; and $T_x^*, T_y^*, \xi_x^*, \xi_y^*$ are estimate values of $T_x$, $T_y$, $\xi_x$, and $\xi_y$, respectively.

In some possible implementations, the expression of the second preset manner is:

$$V = \begin{pmatrix} \frac{T_x^*}{D'(p)} + \xi_x^* \\ \frac{T_y^*}{D'(p)} + \xi_y^* \end{pmatrix}$$

where V represents the third optical flow; $T_x^*, T_y^*, \xi_x^*, \xi_y^*$ are estimate values of $T_x$, $T_y$, $\xi_x$, and $\xi_y$, respectively; $T_x$ and $T_y$ respectively represent displacement parameters of a camera device in the x direction and the y direction with respect to the optical center; $\xi_x$ and $\xi_y$ respectively represent x and y parameters corresponding to the position of the principal point of the camera device; and D'(p) is depth information of a pixel point p in the fourth depth map.

In some possible implementations, the apparatus further includes a blurring module, configured to perform blurring processing on the color image according to the second depth map to obtain a blurred color image.

In some embodiments, the functions provided by or the modules included in the apparatus provided by the embodiments of the present disclosure may be used to implement the method described in the foregoing method embodiments. For specific implementations, reference may be made to the description in the method embodiments above. For the purpose of brevity, details are not described herein again.

The embodiments of the present disclosure further provide a computer-readable storage medium, having computer program instructions stored thereon, where when the computer program instructions are executed by a processor, the foregoing method is implemented. The computer-readable storage medium may be a non-volatile computer-readable storage medium.

The embodiments of the present disclosure further provide an electronic device, including: a processor; and a memory configured to store processor-executable instructions; where the processor is configured to execute the foregoing method.

The electronic device may be provided as a terminal, a server, or devices in other forms.

Figure 13:
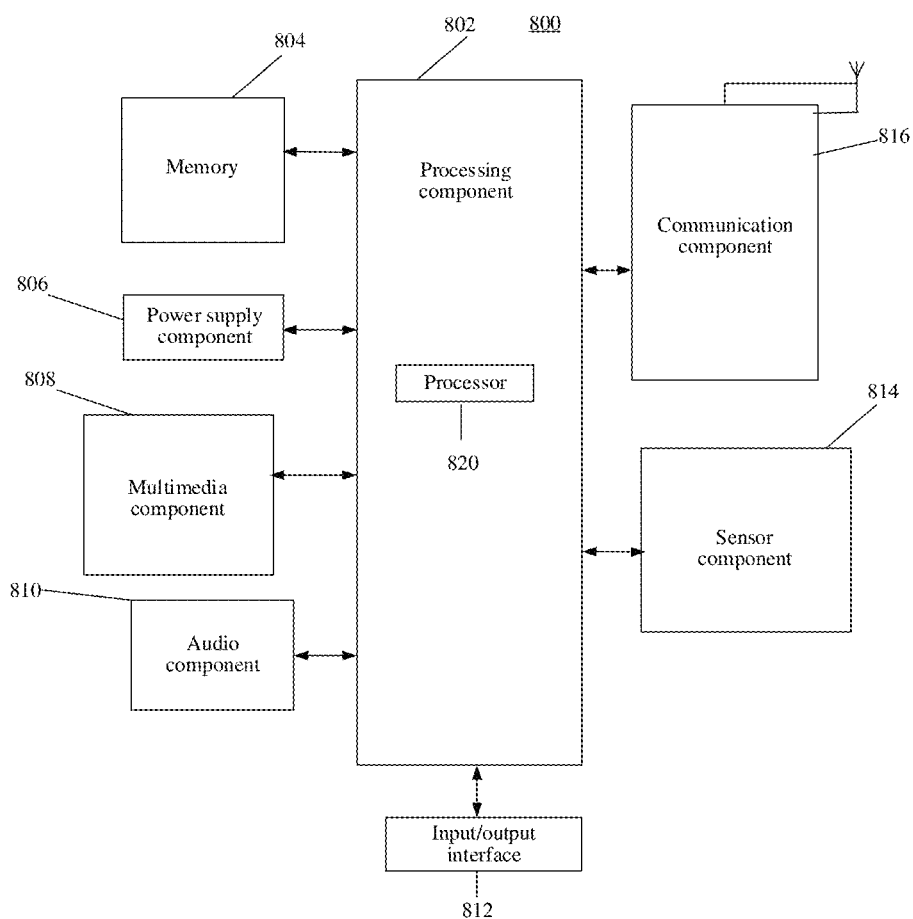
FIG. 13 is a block diagram of an electronic device 800 according to embodiments of the present disclosure.

FIG. 13 is a block diagram of an electronic device 800 according to embodiments of the present disclosure. For example, the electronic device 800 may be a terminal such as a mobile phone, a computer, a digital broadcast terminal, a message transceiver device, a game console, a tablet device, a medical device, exercise equipment, and a personal digital assistant.

Referring to FIG. 13, the electronic device 800 may include one or more of the following components: a processing component 802, a memory 804, a power supply component 806, a multimedia component 808, an audio component 810, an Input/Output (I/O) interface 812, a sensor component 814, and a communications component 816.

The processing component 802 generally controls overall operation of the electronic device 800, such as operations associated with display, phone calls, data communications, camera operations, and recording operations. The processing component 802 may include one or more processors 820 to execute instructions, to complete all or some of the steps of the foregoing method. In addition, the processing component 802 may include one or more modules, for convenience of interaction between the processing component 802 and other components. For example, the processing component 802 may include a multimedia module, for convenience of interaction between the multimedia component 808 and the processing component 802.

The memory 804 is configured to store various types of data to support operations on the electronic device 800. Examples of the data include instructions for any application or method operated on the electronic device 800, contact data, contact list data, messages, pictures, videos, and the like. The memory 804 may be implemented by any type of volatile or non-volatile storage device or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or an optical disc.

The power supply component 806 provides power for various components of the electronic device 800. The power supply component 806 may include a power management system, one or more power supplies, and other components associated with power generation, management, and distribution for the electronic device 800.

The multimedia component 808 includes a screen between the electronic device 800 and a user that provides an output interface. In some embodiments, the screen may include a Liquid Crystal Display (LCD) and a Touch Panel (TP). If the screen includes the touch panel, the screen may be implemented as a touchscreen, to receive an input signal from the user. The touch panel includes one or more touch sensors to sense a touch, a slide, and a gesture on the touch panel. The touch sensor may not only sense a boundary of a touch operation or a slide operation, but also detect duration and pressure related to the touch operation or the slide operation. In some embodiments, the multimedia component 808 includes a front-facing camera and/or a rear-facing camera. When the electronic device 800 is in an operation mode, for example, a photography mode or a video mode, the front-facing camera and/or the rear-facing camera may receive external multimedia data. Each front-facing camera or rear-facing camera may be a fixed optical lens system that has a focal length and an optical zoom capability.

The audio component 810 is configured to output and/or input an audio signal. For example, the audio component 810 includes a microphone (MIC), and the microphone is configured to receive an external audio signal when the electronic device 800 is in an operation mode, such as a calling mode, a recording mode, and a voice recognition mode. The received audio signal may be further stored in the memory 804 or sent by using the communications component 816. In some embodiments, the audio component 810 further includes a speaker, configured to output an audio signal.

The I/O interface 812 provides an interface between the processing component 802 and a peripheral interface module, and the peripheral interface module may be a keyboard, a click wheel, a button, or the like. These buttons may include, but are not limited to, a home button, a volume button, a startup button, and a lock button.

The sensor component 814 includes one or more sensors for providing state assessment in various aspects for the electronic device 800. For example, the sensor component 814 may detect an on/off state of the electronic device 800, and relative positioning of components, which are the display and keypad of the electronic device 800, for example, and the sensor component 814 may further detect a position change of the electronic device 800 or a component of the electronic device 800, the presence or absence of contact of the user with the electronic device 800, the orientation or acceleration/deceleration of the electronic device 800, and a temperature change of the electronic device 800. The sensor component 814 may include a proximity sensor, configured to detect existence of a nearby object when there is no physical contact. The sensor component 814 may further include an optical sensor, such as a CMOS or CCD image sensor, configured for use in imaging application. In some embodiments, the sensor component 814 may further include an acceleration sensor, a gyro sensor, a magnetic sensor, a pressure sensor, or a temperature sensor.

The communication component 816 is configured to facilitate wired or wireless communications between the electronic device 800 and other devices. The electronic device 800 may be connected to a communication-standard-based wireless network, such as Wi-Fi, 2G or 3G, or a combination thereof. In an exemplary embodiment, the communications component 816 receives a broadcast signal or broadcast-related information from an external broadcast management system through a broadcast channel. In an exemplary embodiment, the communications component 816 further includes a Near Field Communication (NFC) module, to facilitate short-range communication. For example, the NFC module is implemented based on a Radio Frequency Identification (RFID) technology, an Infrared Data Association (IrDA) technology, an Ultra Wideband (UWB) technology, a Bluetooth (BT) technology, and other technologies.

In an exemplary embodiment, the electronic device 800 may be implemented by one or more of an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, or other electronic components, and is configured to perform the foregoing method.

In an exemplary embodiment, a non-volatile computer-readable storage medium, for example, the memory 804 including computer program instructions, is further provided. The computer program instructions may be executed by the processor 820 of the electronic device 800 to complete the foregoing method.

Figure 14:
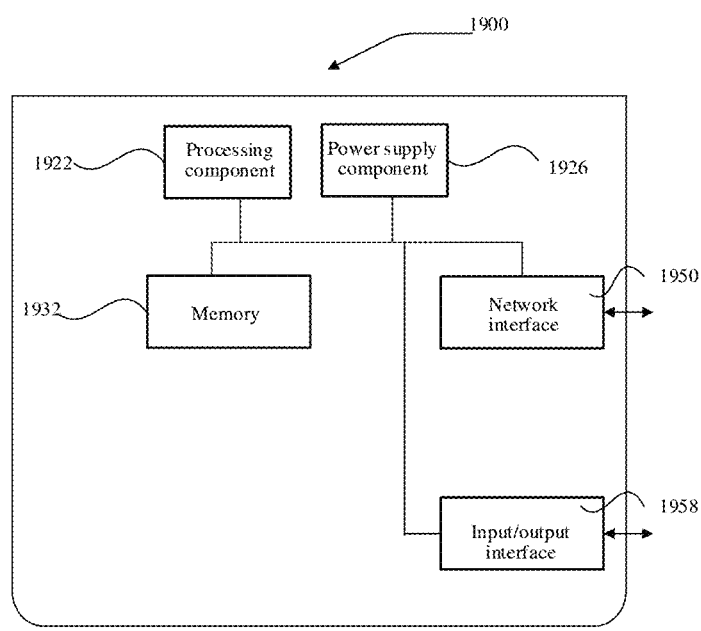
FIG. 14 is a block diagram of an electronic device 1900 according to embodiments of the present disclosure.

FIG. 14 is a block diagram of an electronic device 1900 according to embodiments of the present disclosure. For example, the electronic device 1900 may be provided as a server. With reference to FIG. 14, the electronic device 1900 includes a processing component 1922 which further includes one or more processors, and a memory resource represented by a memory 1932 and configured to store instructions executable by the processing component 1922, for example, an application program. The application program stored in the memory 1932 may include one or more modules, each of which corresponds to a set of instructions. Further, the processing component 1922 may be configured to execute instructions so as to execute the above method.

The electronic device 1900 may further include a power supply component 1926 configured to execute power management of the electronic device 1900, a wired or wireless network interface 1950 configured to connect the electronic device 1900 to the network, and an I/O interface 1958. The electronic device 1900 may be operated based on an operating system stored in the memory 1932, such as Windows Server™, Mac OS X™, Unix™, Linux™, FreeBSD™ or the like.

In an exemplary embodiment, a non-volatile computer-readable storage medium, for example, the memory 1932 including computer program instructions, is further provided. The computer program instructions may be executed by the processing component 1922 of the electronic device 1900 to complete the foregoing method.

The present disclosure may be a system, a method, and/or a computer program product. The computer program product may include a computer-readable storage medium having computer-readable program instructions thereon for causing a processor to implement the aspects of the present disclosure.

The computer-readable storage medium may be a tangible device that can maintain and store instructions used by an instruction execution device. The computer-readable storage medium may be, but is not limited to, an electronic storage device, a magnetic storage device, an optical storage device, an electromagnetic storage device, a semiconductor storage device, or any suitable combination of the above ones. More specific examples (a non-exhaustive list) of the computer readable storage medium include a portable computer disk, a hard disk, a Random Access Memory (RAM), an ROM, an EPROM or flash memory, an SRAM, a portable Compact Disc Read-Only Memory (CD-ROM), a Digital Versatile Disk (DVD), a memory stick, a floppy disk, a mechanical coding device such as a punched card storing instructions or a protrusion structure in a groove, and any appropriate combination thereof. The computer readable storage medium used here is not interpreted as an instantaneous signal such as a radio wave or another freely propagated electromagnetic wave, an electromagnetic wave propagated by a waveguide or another transmission medium (for example, an optical pulse transmitted by an optical fiber cable), or an electrical signal transmitted by a wire.

The computer readable program instructions described here may be downloaded from a computer readable storage medium to each computing/processing device, or downloaded to an external computer or an external storage device via a network, such as the Internet, a local area network, a wide area network, and/or a wireless network. The network may include a copper transmission cable, optical fiber transmission, wireless transmission, a router, a firewall, a switch, a gateway computer, and/or an edge server. A network adapter or a network interface in each computing/processing device receives the computer readable program instructions from the network, and forwards the computer readable program instructions, so that the computer readable program instructions are stored in a computer readable storage medium in each computing/processing device.

Computer program instructions for carrying out operations of the present disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The program readable program instructions may be completely executed on a user computer, partially executed on a user computer, executed as an independent software package, executed partially on a user computer and partially on a remote computer, or completely executed on a remote computer or a server. In the case of a remote computer, the remote computer may be connected to a user computer via any kind of network, including a Local Area Network (LAN) or a Wide Area Network (WAN), or may be connected to an external computer (for example, connected via the Internet with the aid of an Internet service provider). In some embodiments, electronic circuitry including, for example, programmable logic circuitry, Field-Programmable Gate Arrays (FGPAs), or Programmable Logic Arrays (PLAs) may execute the computer-readable program instructions by utilizing state information of the computer-readable program instructions to personalize the electronic circuitry, in order to implement the aspects of the present disclosure.

The aspects of the present disclosure are described herein with reference to flowcharts and/or block diagrams of methods, apparatuses (systems), and computer program products according to the embodiments of the present disclosure. It should be understood that each block in the flowcharts and/or block diagrams and a combination of the blocks in the flowcharts and/or block diagrams may be implemented by using the computer readable program instructions.

These computer readable program instructions may be provided for a general-purpose computer, a dedicated computer, or a processor of another programmable data processing apparatus to generate a machine, so that when the instructions are executed by the computer or the processor of the another programmable data processing apparatus, an apparatus for implementing a specified function/action in one or more blocks in the flowcharts and/or block diagrams is generated. These computer readable program instructions may also be stored in a computer readable storage medium, and these instructions may instruct a computer, a programmable data processing apparatus, and/or another device to work in a specific manner. Therefore, the computer readable storage medium storing the instructions includes an artifact, and the artifact includes instructions for implementing a specified function/action in one or more blocks in the flowcharts and/or block diagrams.

The computer readable program instructions may be loaded onto a computer, another programmable data processing apparatus, or another device, so that a series of operations and steps are executed on the computer, the another programmable apparatus, or the another device, thereby generating computer-implemented processes. Therefore, the instructions executed on the computer, the another programmable apparatus, or the another device implement a specified function/action in one or more blocks in the flowcharts and/or block diagrams.

The flowcharts and block diagrams in the accompanying drawings illustrate the architecture, functionality and operations of possible implementations of systems, methods, and computer program products according to multiple embodiments of the present disclosure. In this regard, each block in the flowcharts or block diagrams may represent a module, a program segment, or a part of instruction, and the module, the program segment, or the part of instruction includes one or more executable instructions for implementing a specified logical function. In some alternative implementations, functions marked in the block may also occur in an order different from that marked in the accompanying drawings. For example, two consecutive blocks are actually executed substantially in parallel, or are sometimes executed in a reverse order, depending on the involved functions. It should also be noted that each block in the block diagrams and/or flowcharts and a combination of blocks in the block diagrams and/or flowcharts may be implemented by using a dedicated hardware-based system that executes a specified function or action, or may be implemented by using a combination of dedicated hardware and a computer instruction.

The descriptions of the embodiments of the present disclosure have been presented for purposes of illustration, but are not intended to be exhaustive or limited to the embodiments disclosed. For a person of ordinary skill in the art, many modifications and variations are all obvious without departing from the scope and spirit of the described embodiments. The terms used in the specification are intended to best explain the principles of the embodiments, practical applications, or technical improvements to the technologies in the market, or to enable others of ordinary skill in the art to understand the embodiments disclosed in the specification.

The invention claimed is:

1. An image processing method, comprising:
obtaining an infrared image and a color image for a same object in a predetermined scenario, and a first depth map corresponding to the color image;
obtaining a first optical flow between the color image and the infrared image; and
performing first optimization processing on the first depth map by using the first optical flow to obtain an optimized second depth map corresponding to the color image,
wherein obtaining the first optical flow between the color image and the infrared image comprises:
inputting the color image and the infrared image to an optical flow estimation model, and obtaining a second optical flow between the color image and the infrared image by using the optical flow estimation model; and performing second optimization processing on the second optical flow based on the first depth map to obtain the first optical flow.

2. The method according to claim 1, wherein performing first optimization processing on the first depth map by using the first optical flow to obtain the optimized second depth map corresponding to the color image comprises:
  performing transform processing on the first depth map according to the first optical flow to obtain a third depth map; and
  performing convolution processing on the third depth map to obtain the optimized second depth map.

3. The method according to claim 1, wherein performing first optimization processing on the first depth map by using the first optical flow to obtain the optimized second depth map corresponding to the color image comprises:
  performing transform processing on the first depth map according to the first optical flow to obtain a third depth map;
  performing filtering processing on the third depth map to obtain a filtered third depth map;
  performing connection processing on the third depth map and the filtered third depth map to obtain a connected depth map; and
  performing convolution processing on the connected depth map to obtain the optimized second depth map.

4. The method according to claim 1, wherein performing second optimization processing on the second optical flow based on the first depth map to obtain the first optical flow comprises:
  performing transform processing on the first depth map according to the first optical flow to obtain a fourth depth map;
  determining, by using a first preset manner, predetermined parameters according to the fourth depth map and the second optical flow;
  determining, by using a second preset manner, a third optical flow according to the predetermined parameters and the fourth depth map; and
  obtaining, based on convolution processing on a connection result of the second optical flow and the third optical flow, the first optical flow after optimization processing of the second optical flow.

5. The method according to claim 4, wherein obtaining, based on convolution processing on the connection result of the second optical flow and the third optical flow, the first optical flow after optimization processing of the second optical flow comprises:
  connecting the second optical flow and the third optical flow to obtain a connected optical flow; and
  performing convolution processing on the connected optical flow to obtain the first optical flow.

6. The method according to claim 4, wherein the first preset manner is expressed as:

$$\{T_x^*, T_y^*, \xi_x^*, \xi_y^*\} = \arg\min_{T_x, T_y, \xi_x, \xi_y} \sum_P \left\| \begin{pmatrix} V_x^0 \\ V_y^0 \end{pmatrix} - \begin{pmatrix} \frac{T_x}{D'(p)} + \xi_x \\ \frac{T_y}{D'(p)} + \xi_y \end{pmatrix} \right\|^2$$

wherein $V_x^0$ is an x value corresponding to each pixel point in the second optical flow; $V_y^0$ is a y value corresponding to each pixel point in the second optical flow; $D'(p)$ is depth information of a pixel point p in the fourth depth map; $T_x$ and $T_y$ respectively represent displacement parameters of a camera device in x direction and y direction with respect to an optical center; $\xi_x$ and $\xi_y$ respectively represent parameters x and y corresponding to a position of a principal point of the camera device; and $T_x^*, T_y^*, \xi_x^*, \xi_y^*$ are estimate values of $T_x$, $T_y$, $\xi_x$, and $\xi_y$, respectively.

7. The method according to claim 4, wherein the second preset manner is expressed as:

$$V = \begin{pmatrix} \frac{T_x^*}{D'(p)} + \xi_x^* \\ \frac{T_y^*}{D'(p)} + \xi_y^* \end{pmatrix}$$

wherein V represents the third optical flow; $T_x^*, T_y^*, \xi_x^*, \xi_y^*$ are estimate values of $T_x$, $T_y$, $\xi_x$ and $\xi_y$, respectively; $T_x$ and $T_y$ respectively represent displacement parameters of a camera device in x direction and y direction with respect to an optical center; $\xi_x$ and $\xi_y$ respectively represent parameters x and y corresponding to a position of a principal point of the camera device; and $D'(p)$ is depth information of a pixel point p in the fourth depth map.

8. The method according to claim 1, wherein the first optical flow between the color image and the infrared image is obtained through a first network module, and
  the method further comprises: training the first network module, comprising:
    inputting a first training sample to the first network module to perform optimization processing twice, the first training sample comprising a color image sample, a first infrared image sample, and a first depth map sample corresponding to the color image sample, wherein an intermediate optical flow between the color image sample and the first infrared image sample is obtained through the first optimization processing, and a first optical flow between the color image sample and the first infrared image sample is obtained through the second optimization processing;
    adding the intermediate optical flow obtained after the first optimization processing and the first optical flow obtained after the second optimization processing to obtain a training-optimized first optical flow; and
    terminating the training of the first network module when a loss value between the training-optimized first optical flow and a real first optical flow meets a first preset requirement, or adjusting, when a loss value between the training-optimized first optical flow and a real first optical flow does not meet the first preset requirement, parameters of the first network module and retraining the first network module.

9. The method according to claim 8, wherein inputting the first training sample to the first network module to perform optimization processing twice comprises:
  inputting the color image sample, the first infrared image sample, and the first depth map sample corresponding to the color image sample in the first training sample to the first network module, and performing the first optimization processing to obtain the intermediate optical flow between the first infrared image sample and the color image sample;

performing correction processing on the first infrared image sample by using the intermediate optical flow between the first infrared image sample and the color image sample to obtain a second infrared image sample; and inputting the color image sample and the first depth map sample corresponding to the color image sample in the first training sample, and the second infrared image sample to the first network module, and performing the second optimization processing to obtain the first optical flow between the first infrared image sample and the color image sample.

10. The method according to claim 1, wherein the first optimization processing is performed on the first depth map by using the first optical flow through a second network module to obtain the optimized second depth map, and the method further comprises: training the second network module, which comprises:

inputting a first depth sample and an optical flow sample in a second training sample to the second network module to obtain a training-optimized second depth map;

obtaining a loss value of the second network module according to the training-optimized second depth map; and terminating the training of the second network module when the loss value meets a second preset requirement; or adjusting, when the loss value does not meet the second preset requirement, parameters of the second network module and retraining the second network module.

11. An image processing apparatus, comprising:
a processor; and
a memory configured to store processor-executable instructions;
wherein the processor is configured to:
obtain an infrared image and a color image for a same object in a predetermined scenario, and a first depth map corresponding to the color image;
obtain a first optical flow between the color image and the infrared image; and
perform first optimization processing on the first depth map by using the first optical flow to obtain an optimized second depth map corresponding to the color image,
wherein obtaining the first optical flow between the color image and the infrared image comprises:
inputting the color image and the infrared image to an optical flow estimation model, and obtaining a second optical flow between the color image and the infrared image by using the optical flow estimation model; and
performing second optimization processing on the second optical flow based on the first depth map to obtain the first optical flow.

12. The apparatus according to claim 11, wherein the processor is further configured to perform transform processing on the first depth map according to the first optical flow to obtain a third depth map, and perform convolution processing on the third depth map to obtain the optimized second depth map.

13. The apparatus according to claim 11, wherein the processor is further configured to:
perform transform processing on the first depth map according to the first optical flow to obtain a third depth map;

perform filtering processing on the third depth map to obtain a filtered third depth map;
perform connection processing on the third depth map and the filtered third depth map to obtain a connected depth map; and
perform convolution processing on the connected depth map to obtain the optimized second depth map.

14. The apparatus according to claim 11, wherein the processor is further configured to:
perform transform processing on the first depth map according to the first optical flow to obtain a fourth depth map;
determine, by using a first preset manner, predetermined parameters according to the fourth depth map and the second optical flow;
determine, by using a second preset manner, a third optical flow according to the predetermined parameters and the fourth depth map; and
obtain, based on convolution processing on a connection result of the second optical flow and the third optical flow, the first optical flow after optimization processing of the second optical flow.

15. The apparatus according to claim 14, wherein the processor is further configured to connect the second optical flow and the third optical flow to obtain a connected optical flow, and perform convolution processing on the connected optical flow to obtain the first optical flow.

16. The apparatus according to claim 14, wherein the first preset manner is expressed as:

$$\{T_x^*, T_y^*, \xi_x^*, \xi_y^*\} = \underset{T_x, T_y, \xi_x, \xi_y}{\operatorname{argmin}} \sum_p \left\| \begin{pmatrix} V_x^0 \\ V_y^0 \end{pmatrix} - \begin{pmatrix} \frac{T_x}{D'(p)} + \xi_x \\ \frac{T_y}{D'(p)} + \xi_y \end{pmatrix} \right\|^2$$

wherein $V_x^0$ is an x value corresponding to each pixel point in the second optical flow; $V_y^0$ is a y value corresponding to each pixel point in the second optical flow; $D'(p)$ is depth information of a pixel point p in the fourth depth map; $T_x$ and $T_y$ respectively represent displacement parameters of a camera device in x direction and y direction with respect to an optical center; $\xi_x$ and $\xi_y$ respectively represent parameters x and y corresponding to a position of a principal point of the camera device; and $T_x^*, T_y^*, \xi_x^*, \xi_y^*$ are estimate values of $T_x$, $T_y$, $\xi_x$, and $\xi_y$ respectively; or wherein the second preset manner is expressed as:

$$V = \begin{pmatrix} \frac{T_x^*}{D'(p)} + \xi_x^* \\ \frac{T_y^*}{D'(p)} + \xi_y^* \end{pmatrix}$$

wherein V represents the third optical flow; $T_x^*, T_y^*, \xi_x^*, \xi_y^*$ are estimate values of $T_x$, $T_y$, $\xi_x$ and $\xi_y$, respectively; $T_x$ and $T_y$ respectively represent displacement parameters of a camera device in x direction and y direction with respect to an optical center; $\xi_x$ and $\xi_y$ respectively represent parameters x and y corresponding to a position of a principal point of the camera device; and $D'(p)$ is depth information of a pixel point p in the fourth depth map.

17. The apparatus according to claim 11, wherein the first optical flow between the color image and the infrared image is obtained through a first network module, and the processor is further configured to: train the first network module, comprising:
inputting a first training sample to the first network module to perform optimization processing twice, the first training sample comprising a color image sample, a first infrared image sample, and a first depth map sample corresponding to the color image sample, wherein an intermediate optical flow between the color image sample and the first infrared image sample is obtained through the first optimization processing, and a first optical flow between the color image sample and the first infrared image sample is obtained through the second optimization processing;
adding the intermediate optical flow obtained after the first optimization processing and the first optical flow obtained after the second optimization processing to obtain a training-optimized first optical flow; and
terminating the training of the first network module when a loss value between the training-optimized first optical flow and a real first optical flow meets a first preset requirement, or adjusting, when a loss value between the training-optimized first optical flow and a real first optical flow does not meet the first preset requirement, parameters of the first network module and retraining the first network module.

18. The apparatus according to claim 17, wherein the processor is further configured to:
input the color image sample, the first infrared image sample, and the first depth map sample corresponding to the color image sample in the first training sample to the first network module, and perform the first optimization processing to obtain the intermediate optical flow between the first infrared image sample and the color image sample;
perform correction processing on the first infrared image sample by using the intermediate optical flow between the first infrared image sample and the color image sample to obtain a second infrared image sample; and
input the color image sample and the first depth map sample corresponding to the color image sample in the first training sample, and the second infrared image sample to the first network module, and perform the second optimization processing to obtain the first optical flow between the first infrared image sample and the color image sample.

19. The apparatus according to claim 11, wherein the processor is further configured to:
perform the first optimization processing on the first depth map by using the first optical flow through a second network module to obtain the optimized second depth map, and
train the second network module, comprising:
inputting a first depth sample and an optical flow sample in a second training sample to the second network module to obtain a training-optimized second depth map;
obtaining a loss value of the second network module according to the training-optimized second depth map; and
terminating the training of the second network module when the loss value meets a second preset requirement; or adjusting, when the loss value does not meet the second preset requirement, parameters of the second network module and retraining the second network module.

20. A non-transitory computer-readable storage medium, having computer program instructions stored thereon, wherein the computer program instructions, when being executed by a processor, enable the processor to implement the following operations:
obtaining an infrared image and a color image for a same object in a predetermined scenario, and a first depth map corresponding to the color image;
obtaining a first optical flow between the color image and the infrared image; and
performing first optimization processing on the first depth map by using the first optical flow to obtain an optimized second depth map corresponding to the color image,
wherein the operation of obtaining the first optical flow between the color image and the infrared image comprises:
inputting the color image and the infrared image to an optical flow estimation model, and obtaining a second optical flow between the color image and the infrared image by using the optical flow estimation model; and
performing second optimization processing on the second optical flow based on the first depth map to obtain the first optical flow.

* * * * *